(12) United States Patent
Omori et al.

(10) Patent No.: US 11,339,232 B2
(45) Date of Patent: May 24, 2022

(54) DISPERSION ASSISTANT FOR SUSPENSION POLYMERIZATION AND METHOD FOR PRODUCING VINYL-BASED POLYMER USING THE SAME

(71) Applicant: Japan Vam & Poval Co., Ltd., Osaka (JP)

(72) Inventors: Takehiro Omori, Osaka (JP); Yoshiaki Kozuka, Osaka (JP)

(73) Assignee: Japan Vam & Poval Co., Ltd., Osaka (JP)

( * ) Notice: Subject to any disclaimer, the term of this patent is extended or adjusted under 35 U.S.C. 154(b) by 545 days.

(21) Appl. No.: 16/343,377

(22) PCT Filed: Oct. 17, 2017

(86) PCT No.: PCT/JP2017/037486
§ 371 (c)(1),
(2) Date: Apr. 18, 2019

(87) PCT Pub. No.: WO2018/083968
PCT Pub. Date: May 11, 2018

(65) Prior Publication Data
US 2019/0248931 A1    Aug. 15, 2019

(30) Foreign Application Priority Data

Nov. 2, 2016 (JP) .................. 2016-215717

(51) Int. Cl.
| | |
|---|---|
| *C08F 8/12* | (2006.01) |
| *C08F 8/28* | (2006.01) |
| *C08F 16/06* | (2006.01) |
| *C08F 18/08* | (2006.01) |
| *C08F 14/06* | (2006.01) |
| *C08L 29/04* | (2006.01) |
| *C08L 29/14* | (2006.01) |
| *C08F 2/20* | (2006.01) |

(52) U.S. Cl.
CPC ............ *C08F 16/06* (2013.01); *C08F 2/20* (2013.01); *C08F 8/12* (2013.01); *C08F 8/28* (2013.01); *C08F 14/06* (2013.01); *C08F 18/08* (2013.01); *C08L 29/04* (2013.01); *C08F 2500/02* (2013.01); *C08L 29/14* (2013.01)

(58) Field of Classification Search
None
See application file for complete search history.

(56) References Cited

U.S. PATENT DOCUMENTS

| | | | |
|---|---|---|---|
| 5,349,008 A | | 9/1994 | Takada et al. |
| 5,866,654 A | * | 2/1999 | Fuss .......... C08F 8/48 525/61 |

| | | | |
|---|---|---|---|
| 2005/0197476 A1 | | 9/2005 | Ooura et al. |
| 2014/0018488 A1 | | 1/2014 | Kawagoe et al. |
| 2015/0191558 A1 | | 7/2015 | Fukuhara et al. |
| 2017/0198068 A1 | * | 7/2017 | Kozuka ............. C08F 214/08 |
| 2019/0031872 A1 | | 1/2019 | Kozuka et al. |

FOREIGN PATENT DOCUMENTS

| | | | |
|---|---|---|---|
| CN | 103596988 A | | 2/2014 |
| EP | 2876116 A1 | | 5/2015 |
| JP | 55-155402 A | | 9/1980 |
| JP | 56-55403 A | | 5/1981 |
| JP | 4-154810 A | | 5/1992 |
| JP | 7-278209 A | | 10/1995 |
| JP | 07278209 A | * | 10/1995 |
| JP | 9-77807 A | | 3/1997 |
| JP | 9-100301 A | | 4/1997 |
| JP | 9-183805 A | | 7/1997 |
| JP | 10-152508 | | 6/1998 |
| JP | 10-168128 A | | 6/1998 |
| JP | 10-259213 A | | 9/1998 |
| JP | 2002-37807 A | | 2/2002 |
| JP | 2002-69105 A | | 3/2002 |
| JP | 2005-281680 A | | 10/2005 |
| JP | 2007-63369 A | | 3/2007 |
| JP | 2013-203994 A | | 10/2013 |
| WO | WO 2015/182567 A1 | | 12/2015 |
| WO | WO-2015182567 A1 | * | 12/2015 ............. C08F 14/06 |
| WO | WO 2017/094698 A1 | | 6/2017 |

OTHER PUBLICATIONS

International Search Report for PCT/JP2017/037486.
International Preliminary Report on Patentability for PCT/JP2017/037486 dated May 7, 2019.

* cited by examiner

*Primary Examiner* — Richard A Huhn
(74) *Attorney, Agent, or Firm* — Knobbe Martens Olson & Bear LLP

(57) ABSTRACT

Provided is a dispersion assistant useful for suspension polymerization of vinyl-based compounds. The dispersion assistant comprises a polyvinyl alcohol-based polymer (A) comprising a constituent unit represented by the general formula (1) shown below at 0.1 to 10 mol % per polyvinyl alcohol monomer unit and having a saponification degree of 15 to 70 mol %.

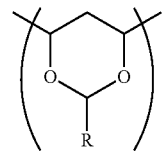

(1)

(In the formula, R denotes an alkyl group.)

12 Claims, No Drawings

DISPERSION ASSISTANT FOR SUSPENSION POLYMERIZATION AND METHOD FOR PRODUCING VINYL-BASED POLYMER USING THE SAME

CROSS REFERENCE TO RELATED APPLICATIONS

This application is a U.S. National Phase Application of PCT International Application Number PCT/JP2017/037486, filed on Oct. 17, 2017, designating the United States of America and published in the Japanese language, which is an International Application of and claims the benefit of priority to Japanese Patent Application No. 2016-215717, filed on Nov. 2, 2016. The disclosures of the above-referenced applications are hereby expressly incorporated by reference in their entireties.

TECHNICAL FIELD

The present invention relates to a polyvinyl alcohol-based polymer suitable to be used as a dispersion assistant for suspension polymerization of a vinyl-based compound, an aqueous liquid comprising the polyvinyl alcohol-based polymer, and a production method of a vinyl chloride-based resin obtained by suspension polymerization using the polyvinyl alcohol-based polymer as a dispersion assistant.

BACKGROUND ART

Generally, a vinyl chloride-based resin (hereinafter may be referred to as a vinyl chloride-based polymer) is produced by suspension polymerization in which a vinyl chloride monomer is dispersed in an aqueous medium with a polymerization initiator, a dispersion stabilizer, etc. for polymerization.

Dispersants used in the suspension polymerization are divided into so-called "dispersion stabilizers (hereinafter may be referred to as primary dispersants)" added to stabilize the dispersibility of the vinyl chloride monomer and adjust the particle diameter of the vinyl chloride-based resin to be produced, and so-called "dispersion assistants (hereinafter may be referred to as secondary dispersants)" added to increase the porosity of the vinyl chloride-based resin particles to be produced.

Conventionally, as the primary dispersant, polyvinyl alcohol (PVA), hydroxypropylmethylcellulose (HPMC), etc. are used. As the secondary dispersant, PVAs having a saponification degree lower than that of the primary dispersant are used (see Patent Literature 1 to 3).

For example, in the method for producing a vinyl chloride-based polymer described in Patent Literature 3, a PVA having a saponification degree of 75 to 85 mol % is used as a primary dispersant, and a PVA having a saponification degree of 20 to 57 mol % is used as a secondary dispersant.

A PVA having a saponification degree of 70 mol % or less has a low affinity to water, and therefore, has a disadvantage of being difficult to use as an aqueous solution or an aqueous liquid. Therefore, when such a PVA is used as a solution or a suspension, it is necessary to use an organic solvent, such as an alcohol. In recent years, from the viewpoints of environmental consciousness and an improved workability, it has been desired to develop a secondary dispersant that is soluble or dispersible in water alone without the need for an organic solvent, such as an alcohol.

In Patent Literature 4 to 12, suggested are methods for producing a vinyl chloride resin using, as a dispersion assistant, a PVA having an improved dispersibility or solubility in water as a result of the introduction of an ionic functional group, such as a carboxylic group, a sulfonic group, and an amino group, or a hydrophilic group other than polyvinyl alcohol, such as polyoxyalkylene.

CITATION LIST

Patent Literature

Patent literature 1: JP 09-77807 A
Patent literature 2: JP 2002-37807 A
Patent literature 3: JP 2005-281680 A
Patent literature 4: JP 04-154810 A
Patent literature 5: JP 09-100301 A
Patent literature 6: JP 09-183805 A
Patent literature 7: JP 10-152508 A
Patent literature 8: JP 10-168128 A
Patent literature 9: JP 10-259213 A
Patent literature 10: JP 2002-69105 A
Patent literature 11: JP 2007-63369 A
Patent literature 12: JP 2013-203994 A

SUMMARY OF INVENTION

Technical Problem

However, according to the present inventors' examination, although the secondary dispersant having an ionic functional group or a polyoxyalkylene group introduced thereto has an improved solubility or dispersibility in water, the secondary dispersant is still unsatisfactory in terms of the improvement in the porosity, which is an essential feature of a secondary dispersant, and also may cause unstable polymerization and significant scale adhesion to the polymerization tank.

Also, regarding the dispersion assistant of which the solubility or dispersibility in water is improved by introducing an ionic functional group, an aqueous liquid comprising 10% by mass or less of PVA can be obtained, but an aqueous liquid having a high PVA content cannot be obtained because the dispersion assistant aggregates at a PVA content of 20% by mass or more.

An object of the present invention is to provide a dispersion assistant comprising a polyvinyl alcohol-based polymer, the dispersion assistant exerting, when used for suspension polymerization of vinyl-based monomers, the effects of 1) achieving stable suspension polymerization with reduced scale adhesion to the polymerization tank, 2) giving a vinyl chloride-based resin excellent in residual vinyl monomer removability, and/or 3) giving a vinyl chloride-based resin having a high porosity and an excellent plasticizer absorbability.

Another object of the present invention is to provide an aqueous solution comprising a dispersion assistant for suspension polymerization which solution is stable even at a high concentration, and a production method of a vinyl chloride-based resin using the dispersion assistant for suspension polymerization.

Solution to Problem

In view of the circumstances, the present inventors conducted extensive research, and found that, when a dispersion assistant for suspension polymerization used in suspension polymerization of vinyl chloride comprises a polyvinyl alcohol-based polymer (A) comprising a constituent unit represented by the general formula (1) at 0.1 to 10 mol % per polyvinyl alcohol monomer unit and having a saponification degree of 15 to 70 mol %, stable polymerization is achieved, and a vinyl chloride-based resin excellent in residual monomer removability and plasticizer absorbability is obtained.

Also, the present inventors found that, when an aqueous liquid comprising a dispersion assistant for suspension polymerization comprises a polyvinyl alcohol-based polymer (A) comprising a constituent unit represented by the general formula (1) at 0.1 to 10 mol % per polyvinyl alcohol monomer unit, and having a saponification degree of 50 to 70 mol %, an average polymerization degree of 120 to 400, and a block character of 0.5 or higher, the aqueous liquid is stable and has a viscosity easy to handle even in the cases where the aqueous liquid comprises 30 to 50 mol % of the polyvinyl alcohol-based polymer (A). The present inventors conducted further investigation and completed the present invention.

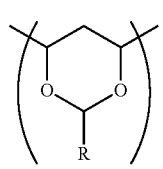

(1)

(In the formula, R denotes an alkyl group.)

That is, the present invention relates to the following dispersion assistants for suspension polymerization, etc.

[1] A dispersion assistant for suspension polymerization (an additive for suspension polymerization or a dispersant for suspension polymerization) comprising a polyvinyl alcohol-based polymer (A) comprising a constituent unit represented by the general formula (1) shown below at 0.1 to 10 mol % per polyvinyl alcohol monomer unit and having a saponification degree of 15 to 70 mol %.

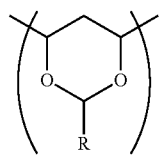

(1)

(In the formula, R denotes an alkyl group.)

[2] The dispersion assistant for suspension polymerization of the above [1], wherein R in the constituent unit represented by the general formula (1) is an alkyl group having 3 to 11 carbon atoms.

[3] The dispersion assistant for suspension polymerization of the above [1] or [2], wherein the average polymerization degree of the polyvinyl alcohol-based polymer (A) is 120 to 800.

[4] An aqueous liquid comprising the dispersion assistant for suspension polymerization of any one of the above [1] to [3].

[5] The aqueous liquid of the above [4], wherein the polyvinyl alcohol-based polymer (A) has a saponification degree of 50 to 70 mol %, an average polymerization degree of 120 to 400, and a block character of 0.5 or higher.

[6] The aqueous liquid of the above [4] or [5], comprising the polyvinyl alcohol-based polymer (A) in an amount of 30 to 50% by mass.

[7] A production method of a vinyl-based resin, comprising subjecting a vinyl-based monomer to suspension polymerization in the presence of the dispersion assistant for suspension polymerization of any one of the above [1] to [3].

[8] The production method of the above [7], wherein a water-soluble polymer is further present in the suspension polymerization.

[9] The production method of the above [8], wherein the water-soluble polymer is a polyvinyl alcohol-based polymer having a saponification degree of 65 to 90 mol %.

[10] The production method of any one of the above [7] to [9], wherein the vinyl-based monomer comprises vinyl chloride.

[11] A composition comprising a water-soluble polymer (or a dispersion stabilizer) and the polyvinyl alcohol-based polymer (A) (or the dispersion assistant for suspension polymerization) of any one of the above [1] to [3].

[12] The composition of the above [11], wherein the water-soluble polymer (or the dispersion stabilizer) comprises a polyvinyl alcohol-based polymer other than the polyvinyl alcohol-based polymer (A), in particular, a polyvinyl alcohol-based polymer having a saponification degree of 65 to 90 mol % and the mass ratio between the water-soluble polymer and the polyvinyl alcohol-based polymer (A) is 90/10 to 30/70.

Advantageous Effects of Invention

The dispersion assistant of the present invention for suspension polymerization stabilizes suspension polymerization, and as a result, scale adhesion of the obtained vinyl-based resin (in particular, a vinyl chloride-based resin) to the polymerization tank is reduced, and the vinyl-based resin has fewer coarse particles.

With the dispersion assistant of the present invention for suspension polymerization, a vinyl-based resin (in particular, a vinyl chloride-based resin) excellent in residual vinyl monomer removability can be obtained, which contributes to energy saving and productivity improvement.

In the present invention, a vinyl-based resin (in particular, a vinyl chloride-based resin) which has a high porosity and an excellent plasticizer absorbability, and therefore is excellent in molding processability can be produced.

Since the dispersion assistant of the present invention for suspension polymerization can be handled as a stable aqueous liquid even at a high concentration, environmental burden due to the use of organic solvents can be reduced.

DESCRIPTION OF EMBODIMENTS

Hereinafter, embodiments of the present invention will be described in detail. However, the present invention is not limited to the embodiments described below.

The dispersion assistant (dispersant) for suspension polymerization of the present invention is characterized by comprising a polyvinyl alcohol-based polymer (A) (PVA-based polymer (A)) comprising a constituent unit represented by the general formula (1). The dispersion assistant of the present invention for suspension polymerization may comprise one kind of the PVA-based polymer (A) or two or more kinds thereof.

PVA-Based Polymer (A)

The PVA-based polymer (A) is characterized by comprising a constituent unit represented by the general formula (1). Herein, R in the constituent unit represented by the general formula (1) is an alkyl group (a saturated aliphatic hydrocarbon group), preferably an alkyl group having 1 or more carbon atoms, more preferably an alkyl group having 3 to 11 carbon atoms, and still more preferably an alkyl group having 4 to 9 carbon atoms.

When the number of carbon atoms in the alkyl group is as above, suspension polymerization using the dispersion assistant comprising the PVA-based polymer (A) readily gives a vinyl-based resin excellent in residual monomer removability and plasticizer absorbability. In addition, hydrophilicity of the PVA-based polymer (A) is readily ensured, and as a result, dispersibility in an aqueous medium during suspension polymerization is also readily ensured.

The alkyl group is not particularly limited, and examples thereof include chain alkyl groups (for example, a methyl group, an ethyl group, a propyl group, a butyl group, a pentyl group, a hexyl group, a heptyl group, an octyl group, a nonyl group, a decyl group, an undecyl group), a cyclopentyl group, a cyclohexyl group, etc. These alkyl groups may also include a branched structure, a cyclic structure, or the like.

Also, the alkyl group may have a substituent. The substituent is not particularly limited, and examples thereof include a hydroxyl group, an aromatic group, a halogen group, a carboxyl group, an ether group, an ester group, an alkoxy group, a nitro group, an amino group, etc. These substituents may be used alone or in combination of two or more thereof as the substituent(s) of the alkyl group.

The content of the constituent unit represented by the general formula (1) in the PVA-based polymer (A) may be, for example, 0.1 to 10 mol %, preferably 0.2 to 5 mol %, and more preferably 0.3 to 3 mol % per polyvinyl alcohol monomer unit.

The content of 1 mol % means that one constituent unit represented by the general formula (1) is present per 100 monomer units (for example, vinyl alcohol units).

The content equal to or more than a certain amount (for example, 0.1 mol % or more) is preferable because when such a PVA-based polymer (A) is used for suspension polymerization, a vinyl-based resin excellent in residual monomer removability and plasticizer absorbability is obtained. Also, the content equal to or less than a certain amount (for example, 10 mol % or less) is preferable because when such a PVA-based polymer (A) is used for suspension polymerization, hydrophobicity of the PVA-based polymer (A) does not become too high and dispersibility in an aqueous medium is maintained.

In the present invention, the method for measuring the content of the constituent unit represented by the general formula (1) is not particularly limited, and examples thereof include a method in which the PVA-based polymer (A) dissolved in a $d_6$-DMSO solvent is subjected to $^1$H-NMR spectroscopy for analysis of signals attributable to an alkyl group (for example, a terminal methyl group).

The method for obtaining the constituent unit represented by the general formula (1) is not particularly limited. Preferably, the constituent unit is obtained by acetalization of a PVA-based polymer (B) with a compound corresponding to R, as described later.

Examples of the compound corresponding to R include aldehydes and acetals therefrom. The number of carbon atoms of the aldehyde (aliphatic aldehyde) may be 2 or more, preferably 3 or more, and more preferably 4 to 12, in particular, 5 to 10. When the number of carbon atoms in the aldehyde is as above, suspension polymerization using the dispersion assistant comprising the PVA-based polymer (A) readily gives a vinyl-based resin excellent in residual monomer removability and plasticizer absorbability. In addition, hydrophilicity of the PVA-based polymer (A) is readily ensured, and as a result, dispersibility in an aqueous medium during suspension polymerization is also readily ensured.

The aldehyde is not particularly limited, and specific examples thereof include optionally substituted alkanals (chain or cyclic alkanals), for example, acetaldehyde, propionaldehyde, butanal, pentanal, hexanal, heptanal, octanal, nonanal, decanal, undecanal, dodecanal, 2-methylbutanal, 2-ethylbutanal, 2-methylpentanal, 2-ethylhexanal, cyclopentanecarboxyaldehyde (cyclopentanecarboaldehyde), cyclohexanecarboxyaldehyde (cyclohexanecarboaldehyde), 3-phenylpropionaldehyde, 6-chlorohexanal, 10-undecanal, etc.

In the present invention, an acetal which is a condensate of an aldehyde and an alcohol may also be used. The acetal is not particularly limited, and examples thereof include a condensate with a primary alcohol (for example, methanol) etc.

The aldehydes and the acetals may be used alone or in combination of two or more thereof.

Polyvalent aldehydes, such as glyoxal and glutaraldehyde, are not preferred because they may unfavorably insolubilize the polyvinyl alcohol-based polymer (A) obtained after acetalization.

Also, the PVA-based polymer (A) may have a constituent unit (b) (an acetal unit) which is not within the category of the constituent unit (a) represented by the general formula (1). The method for introducing the constituent unit (b) is not particularly limited, and examples of the method include a method involving acetalization of a PVA-based polymer (B) with an aldehyde other than aliphatic aldehydes.

Examples of the aldehyde other than aliphatic aldehydes include aromatic aldehydes, such as benzaldehyde, 2-naphthaldehyde, and terephthalaldehydic acid; alkenals, such as acrolein, methacrolein, crotonaldehyde, and cinnamaldehyde; etc.

In the cases where the PVA-based polymer (A) has a constituent unit (b), the percentage of the constituent units (b) relative to the total acetal units may be, for example, 50 mol % or less, preferably 30 mol % or less, and still more preferably 10 mol % or less.

The saponification degree of the PVA-based polymer (A) is, for example, 15 to 70 mol %, preferably 30 to 65 mol % (for example, not less than 30 mol % and less than 65 mol %), and more preferably 45 to 60 mol % as measured by the method specified in JIS K-6726.

The saponification degree of about 15 mol % or more is preferable because in this case, the polymer is readily dispersed in an aqueous medium at the time of suspension polymerization. The saponification degree of about 70 mol % or less is preferable because when such a PVA-based polymer (A) is used for suspension polymerization, a vinyl-based resin excellent in residual monomer removability and plasticizer absorbability is obtained.

The saponification degree of the PVA-based polymer (A) can be adjusted by, for example, the saponification degree of the PVA-based polymer (B), from which the PVA-based polymer (A) is obtained. For example, in the acetalization of the PVA-based polymer (B) using an aliphatic aldehyde or the like, allowing the reaction system to contain water leads to reduced changes in the saponification degree of the PVA-based polymer in the acetalization. That is, the difference in the saponification degree between the PVA-based polymer (A) and the PVA-based polymer (B) can be kept within a range of, for example, about 0 to 5 mol %.

The (average) polymerization degree of the PVA-based polymer (A) is not particularly limited, and the polymerization degree as measured by the method specified in JIS K-6726 is preferably 120 to 800, and more preferably 160 to 400.

The polymerization degree of the PVA-based polymer (A) of about 120 or more is preferable because in this case, stable suspension polymerization is achieved, scale adhesion to the polymerization tank is reduced, and the particle size of the obtained vinyl-based resin is less likely to be coarsened. The polymerization degree of about 800 or less is preferable because in this case, the polymer is readily dispersed in an aqueous medium at the time of suspension polymerization.

The polymerization degree of the PVA-based polymer (A) can be adjusted by the polymerization degree of the PVA-based polymer (B), and usually, the polymerization degree of the PVA-based polymer (A) reflects the polymerization degree of the PVA-based polymer (B).

The PVA-based polymer (A) is usually not fully saponified and has structural units originated from vinyl ester-based monomers (residual ester units) as described above. Such structural units (residual ester units) correspond to structural units originated from the vinyl ester-based monomers (aliphatic vinyl esters, such as vinyl acetate, vinyl formate, vinyl propionate, vinyl caprylate, and vinyl versatate) of the PVA-based polymer (B) described later.

The block character of the residual ester groups (fatty acid groups) in the PVA-based polymer (A) is not particularly limited, but preferably 0.3 to 0.8, and more preferably 0.35 to 0.55. The block character of about 0.8 or less is preferable because when such a PVA-based polymer (A) is used for suspension polymerization, a vinyl-based resin excellent in residual monomer removability and plasticizer absorbability is obtained. The block character of about 0.3 or more is preferable because in this case, the polymer is readily dispersed in an aqueous medium.

Herein, the block character (η) of the residual ester groups is an index showing the distribution of the residual fatty acid groups in the PVA-based polymer, and is determined by analysis of three peaks appearing in the methylene region of a $^{13}$C-NMR spectrum. The three peaks correspond to three kinds of dyads of (OH, OH), (OH, OR), and (OR, OR), and the ratio of the absorption intensities is proportional to the ratio of the three dyads. The block character (η) is represented by the formula (2) shown below. The OR group is an ester group (i.e., a unit from a vinyl ester), and in the cases where vinyl acetate is used as the vinyl ester, for example, the OR group denotes an acetoxy group (OAc group).

$$\eta = (OH, OR)/[2(OH)(OR)] \quad \text{Formula (2)}$$

(In the formula, (OH, OR) denotes the fraction of the dyad (OH, OR) in which an OH group is adjacent to an OR group, and is determined from the relative intensity of the methylene carbon in a $^{13}$C-NMR spectrum. (OH) denotes the saponification degree expressed in molar percentage, and (OR) denotes the fraction of the residual ester groups (fatty acid groups) expressed in molar percentage.)

In the formula (2), (OH, OR) denotes the fraction of (OH, OR) relative to the total amount of (OH, OH), (OH, OR), and (OR, OR). Also, (OH) denotes the fraction of (OH) relative to the total amount of (OH) and (OR) contained in the PVA-based polymer (A), and (OR) denotes the fraction of (OR) relative to the total amount of (OH) and (OR) contained in the PVA-based polymer (A).

The block character takes a value of 0 to 2. A value closer to 0 means that the residual ester groups exhibit a higher blocking tendency, a value closer to 1 means that OH groups and OR groups are present in a more random manner, and a value closer to 2 means that OH groups and OR groups are present in a more highly alternating manner. The block character of the residual ester groups influences the dispersibility of a vinyl-based monomer, such as a vinyl chloride monomer. Regarding the block character, the measurement method and the like are described in detail in "Poval" published by Kobunshi Kankokai, 246-249 (1981) and Macromolecules, 10, 532 (1977).

The block character of the residual ester groups of the PVA-based polymer (A) can be adjusted by the block character of the PVA-based polymer (B), from which is the PVA-based polymer (A) is obtained. For example, in the acetalization of the PVA-based polymer (B) using an aliphatic aldehyde or the like, allowing the reaction system to contain water leads to reduced changes in the block character of the PVA-based polymer in the acetalization. That is, the difference in the block character of the residual ester groups between the PVA-based polymer (A) and the PVA-based polymer (B) can be kept within a range of, for example, about 0 to 0.1.

Aqueous Liquid

The PVA-based polymer (A) may be used as it is as a dispersion assistant (dispersant, secondary dispersant) or dissolved in water for use as an aqueous liquid.

The aqueous liquid of the present invention is only required to contain a PVA-based polymer (A) and water. The aqueous liquid is, for example, obtained by dispersing or dissolving a PVA-based polymer (A) as a dispersoid in water.

The saponification degree of the PVA-based polymer (A) in the aqueous liquid containing the PVA-based polymer (A) may be selected from the range described above, and in particular, preferably 50 to 70 mol %. The saponification degree of about 50 mol % or more is preferable because in this case, the aqueous liquid is excellent in stability and flowability. The saponification degree of about 70 mol % or less is preferable because when such a PVA-based polymer (A) is used for suspension polymerization, a vinyl-based resin excellent in residual monomer removability and plasticizer absorbability is obtained.

The average polymerization degree of the PVA-based polymer (A) in the aqueous liquid containing the PVA-based polymer (A) may be selected from the range described above, and in particular, preferably 120 to 400, and more preferably 160 to 300. The polymerization degree of the PVA-based polymer (A) of 120 or more is preferable because in this case, stable suspension polymerization is achieved, scale adhesion to the polymerization tank is reduced, and the particle size of the obtained vinyl-based resin is less likely to be coarsened. The polymerization degree of about 400 or less is preferable because in this case, the aqueous liquid is excellent in flowability.

The block character of the residual ester groups (fatty acid groups) of the PVA-based polymer (A) in the aqueous liquid containing the PVA-based polymer (A) may be selected from the range described above, and in particular, preferably 0.5 or higher, more preferably 0.6 to 0.8. The block character of about 0.5 or higher is preferable because in this case, the viscosity of the aqueous liquid is reduced, and an aqueous liquid excellent in flowability and easy to handle is obtained. The block character of about 0.8 or lower is preferable because when such a PVA-based polymer (A) is used for suspension polymerization, a vinyl-based resin excellent in residual monomer removability and plasticizer absorbability is obtained.

The content of the PVA-based polymer (A) in the aqueous liquid is preferably 30 to 50% by mass. The percentage of the polymer (A) of about 30% by mass or more is preferable because in this case, a good compatibility of the PVA-based polymer (A) with water is achieved, the PVA-based polymer (A) does not separate from water, and the standing stability of the aqueous liquid improves. Meanwhile, the percentage of about 50% by mass or less is preferable because in this case, the aqueous liquid has a low viscosity and is excellent in flowability.

The aqueous liquid of the present invention has, even when the content of the PVA-based polymer (A) is as high as about 30 to 50% by mass, a good stability (in particular, a good stability without the use of an organic solvent, a dispersant, or an emulsifier), and has a good standing stability for a long period of time (for example, 1 year or longer).

The method for preparing the aqueous liquid is not particularly limited, and examples thereof include a method in which the solvent, such as methanol, used at the time of acetalization is replaced with water by steam injection or the like, a method in which the PVA-based polymer (A) is added to water with stirring, and the PVA is dissolved or dispersed in water by continuous stirring, etc.

For an improved standing stability, the aqueous liquid may further comprise a water-soluble organic solvent etc. Examples of the water-soluble organic solvent include alcohols, such as methanol, ethanol, n-propanol, isopropanol, n-butanol, and isobutanol; esters, such as methyl acetate and ethyl acetate; glycol derivatives, such as ethylene glycol, ethylene glycol monomethyl ether, and ethylene glycol monoethyl ether; etc. The organic solvents may be used alone or as a mixture of two or more kinds thereof.

In the cases where a water-soluble organic solvent is contained, the percentage of the water-soluble organic solvent relative to the whole solvent may be, for example, 70% by mass or less (for example, 60% by mass or less), preferably 50% by mass or less, and more preferably 30% by mass or less. In particular, from the viewpoints of environmental consciousness and an improved workability, the content of the organic solvent is preferably 5% by mass or less relative to the whole solvent or the aqueous liquid.

The pH of the aqueous liquid of the present invention as measured at 20° C. by the method specified in JIS Z-8802 is preferably 4.5 to 7.0.

When the pH of the aqueous liquid is about 4.5 or higher, in the cases where the aqueous liquid comprising the PVA-based polymer (A) is stored for long period of time (for example, for 6 months or longer), the reduction in the content of the constituent unit represented by the general formula (1) in the PVA-based polymer (A) can be suppressed. The pH of about 7 or less is preferable because in this case, the changes in the saponification degree of the PVA-based polymer (A) as a result of saponification can be suppressed.

The pH of the aqueous liquid of the present invention can be adjusted by, for example, adjusting the pH at the time of neutralization in the acetalization. Alternatively the pH of the aqueous liquid can be adjusted by adding an acidic or basic substance after the aqueous liquid is prepared. The acidic or basic substance is preferably the one used in the saponification or the acetalization described later.

The viscosity of the aqueous liquid of the present invention as measured with a Brookfield rheometer at 20° C. is preferably 5000 mPa·s or less, and more preferably 2500 mPa·s or less, for a good flowability and easy handling of the aqueous liquid.

In the present invention, the method for producing the PVA-based polymer (A) is not particularly limited, and for example, the PVA-based polymer (A) can be obtained by reacting a PVA-based polymer (B) with a compound corresponding to R (an aliphatic aldehyde etc.) for acetalization. Hereafter, the PVA-based polymer (B) and acetalization will be described in detail.

PVA-Based Polymer (B)

The PVA-based polymer (B) is not particularly limited, and for example, a conventionally known PVA-based polymer obtainable by saponification of a vinyl ester-based polymer may be used.

The vinyl ester-based polymer is obtainable by polymerizing a vinyl ester-based monomer. The polymerization method is not particularly limited, and may be a conventionally known method, such as bulk polymerization, solution polymerization, suspension polymerization, emulsion polymerization, or the like. Considering the control of the polymerization degree and saponification performed after the polymerization, solution polymerization using methanol as a solvent or suspension polymerization using water or a combination of water and methanol as a dispersion medium is preferred, but the method is not limited to these.

The vinyl ester-based monomer used for the polymerization is not particularly limited, and examples thereof include aliphatic vinyl esters, such as vinyl acetate, vinyl formate, vinyl propionate, vinyl caprylate, and vinyl versatate. These vinyl ester-based monomers may be used alone or in combination of two or more kinds thereof. Among them, vinyl acetate is industrially preferred.

In the polymerization of the vinyl ester-based monomer, the vinyl ester-based monomer may be copolymerized with another kind of monomer as long as the effect of the present invention is exerted.

Said another monomer used in the copolymerization is not particularly limited, and examples thereof include α-olefins, such as ethylene, propylene, n-butene, and isobutylene; (meth)acrylic acid and salts thereof; (meth)acrylic esters, such as (meth)acrylic alkyl esters (such as $C_{1-20}$ alkyl (meth)acrylates, such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate); (meth)acrylamide and (meth)acrylamide derivatives, such as N-methyl(meth)acrylamide, N-ethyl(meth)acrylamide, N,N-dimethyl(meth)acrylamide, diacetone (meth)acrylamide, (meth)acrylamide propane sulfonic acid and salts thereof, (meth)acrylamidopropyldimethylamine and salts or quaternary salts thereof, and N-methylol(meth)acrylamide; vinyl ethers, such as $C_{1-20}$ alkyl vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles, such as acrylonitrile and methacrylonitrile; vinyl halides, such as vinyl chloride and vinyl fluoride; vinylidene halides, such as vinylidene chloride and vinylidene fluoride; allylic compounds, such as allyl acetate and allyl chloride; unsaturated dicarboxylic acids, such as maleic acid, itaconic acid, and fumaric acid, and salts or esters thereof; vinylsilyl compounds, such as vinyltrimethoxysilane; aliphatic alkylesters, such as isopropenyl acetate; and the like. The monomers may be used alone or in combination of two or more kinds thereof.

When said another monomer is used, the content of the monomer is, for example, 0.1 to 20% by mass relative to the total amount of the vinyl ester-based monomer.

In the polymerization of a vinyl ester-based monomer, a chain transfer agent may be added for the purpose of controlling the polymerization degree of the resulting vinyl ester-based polymer.

The chain transfer agent is not particularly limited, and examples thereof include aldehydes, such as acetaldehyde, propionaldehyde, butyraldehyde, and benzaldehyde; ketones, such as acetone, methyl ethyl ketone, hexanone, and cyclohexanone; mercaptans, such as 2-hydroxyethanethiol and dodecyl mercaptan; and organic halogens, such as carbon tetrachloride, trichloroethylene, and perchloroethylene. Among them, aldehydes and ketones are preferably used. The amount of the chain transfer agent added is determined depending on the chain transfer constant of the chain transfer agent and the intended polymerization degree of the vinyl ester-based polymer, and in general, is preferably 0.1 to 10 weight % relative to the vinyl ester-based monomer.

A PVA-based polymer (B) can be produced by subjecting the vinyl ester-based polymer obtained as described above to saponification.

The saponification method of the vinyl ester-based polymer is not particularly limited, and may be a conventionally known method. Examples of the method include alcoholysis or hydrolysis using a basic catalyst, such as hydroxides of alkali metals, such as sodium hydroxide and potassium hydroxide; hydroxides of alkaline earth metals, such as calcium hydroxide; and organic amines, such as primary alkanolamines, such as monoethanolamine, aminoethylethanolamine, monoisopropanolamine, N-(2-hydroxypropyl)-ethylenediamine, 2-amino-1-butanol, 2-amino-2-methyl-1-propanol, 3-amino-1-propanol, 2-amino-2-methyl-1,3-propanediol, 2-amino-2-ethyl-1,3-propanediol, and tris(hydroxyethyl)-aminomethane; secondary alkanolamines, such as diethanolamine, methylethanolamine, butylmethanolamine, N-acetylethanolamine, and diisopropanolamine; tertiary alkanolamines, such as triethanolamine, methyldiethanolamine, dimethylethanolamine, diethylethanolamine, ethyldiethanolamine, and tri-isopropanolamine; primary alkylamines, such as methylamine, ethylamine, isobutylamine, tert-butylamine, and cyclohexylamine; secondary alkylamines, such as dimethylamine, diethylamine, and diisopropylamine; and tertiary alkylamines, such as trimethylamine; or an acidic catalyst, such as inorganic acids, such as hydrochloric acid, sulfuric acid, nitric acid, and phosphoric acid; and organic acids, such as formic acid, acetic acid, oxalic acid, and p-toluenesulfonic acid.

Examples of the solvent used for the saponification include alcohols, such as methanol and ethanol; esters, such as methyl acetate and ethyl acetate; ketones, such as acetone and methyl ethyl ketone; aromatic hydrocarbons, such as benzene and toluene; etc., and these may be used alone or in combination of two or more kinds.

The saponification degree of the PVA-based polymer (B) is not particularly limited. In the subsequent acetalization, the resulting PVA-based polymer (A) has a saponification degree higher than that of the PVA-based polymer (B) as the starting material. Therefore, the saponification degree of the PVA-based polymer (B) is preferably adjusted to a value lower (for example, 0 to 5 mol % lower) than the targeted saponification degree of the PVA-based polymer (A).

The polymerization degree of the PVA-based polymer (B) is not particularly limited. In the subsequent acetalization, the resulting PVA-based polymer (A) has a polymerization degree reflecting that of the PVA-based polymer (B) as the starting material. Therefore, the polymerization degree of the PVA-based polymer (B) is preferably adjusted to a targeted polymerization degree of the PVA-based polymer (A).

The block character of the residual ester groups of the PVA-based polymer (B) is not particularly limited, and is preferably adjusted to almost the same value as the targeted block character of the PVA-based polymer (A).

For example, the block character of the residual ester groups (fatty acid groups) in the PVA-based polymer (B) is not particularly limited, and may be selected from the same range as described above. From the viewpoint of industrial productivity in particular, the block character is preferably 0.3 to 0.8.

In the present invention, the block character of the ester groups (fatty acid groups) of the PVA-based polymer (B) can be adjusted by selecting the kinds of the saponification catalyst, the solvent, and the like used in the production of the PVA-based polymer (B) by saponification of a vinyl ester-based polymer.

A block character of 0.6 or lower can be conveniently achieved by a method in which saponification is performed using a basic catalyst, such as hydroxides of alkali metals, such as sodium hydroxide and potassium hydroxide.

A block character of 0.6 or higher can be conveniently achieved by a method in which saponification is performed using an acidic catalyst, such as inorganic acids, such as hydrochloric acid, sulfuric acid, nitric acid, and phosphoric acid; and organic acids, such as formic acid, acetic acid, oxalic acid, and p-toluenesulfonic acid.

The adjustment can also be made by a method in which the obtained PVA-based polymer is heated to increase the block character.

Acetalization

In the present invention, the method for introducing the constituent unit represented by the general formula (1) to the PVA-based polymer (A) is not particularly limited. For example, a PVA-based polymer (A) can be obtained by acetalization of a PVA-based polymer (B) with a compound corresponding to R (an aliphatic aldehyde etc.). The acetalization method is not particularly limited, and a publicly known acetalization method may be used.

In the acetalization, the amount of the compound corresponding to R (an aliphatic aldehyde etc.) used is not particularly limited, and is, for example, 0.1 to 40 parts by mass, preferably 0.2 to 20 parts by mass, and more preferably 0.5 to 10 parts by mass, relative to 100 parts by mass of the PVA-based polymer (B).

The acetalization is preferably performed in the presence of an acidic catalyst. The acidic catalyst is not particularly limited, and examples thereof include inorganic acids, such as hydrochloric acid, sulfuric acid, nitric acid, and phosphoric acid; and organic acids, such as formic acid, acetic acid, oxalic acid, and p-toluenesulfonic acid.

The amount of the acidic catalyst used is not particularly limited, and is, for example, 0.1 to 10 parts by mass relative to 100 parts by mass of the PVA-based polymer (B).

The acetalization may be performed in the presence of water. In the presence of water, the acetalization of the PVA-based polymer (B) can be performed with less changes in the properties, for example, on the block character, and therefore, the properties of the PVA-based polymer (B) are easily reflected in the properties of the PVA-based polymer (A).

Specific examples of the acetalization method include the following methods: (i) a vinyl ester-based polymer is saponified in a solvent, such as methanol, in the presence of a basic catalyst, such as sodium hydroxide, to give a solution of a PVA-based polymer (B), to this, an aliphatic aldehyde etc. and an acidic catalyst are added for acetalization, and then the solution is neutralized with a basic substance to give a solution of a PVA-based polymer (A); (ii) a vinyl ester-based polymer is saponified in a solvent, such as methanol, in the presence of an acidic catalyst as a saponification catalyst to give a PVA-based polymer (B), to this, an aliphatic aldehyde etc. is added still in the presence of the acidic catalyst for acetalization, and then the solution is neutralized with a basic substance to give a solution of a PVA-based polymer (A); (iii) a vinyl ester-based polymer is saponified in a solvent in the presence of an acidic catalyst to give a PVA-based polymer (B) as in the above (ii) except that the aliphatic aldehyde etc. is added before the start of the saponification, the PVA-based polymer (B) is acetalized, and then the solution is neutralized with a basic substance to give a solution of a PVA-based polymer (A); (iv) an aliphatic aldehyde is dissolved in a PVA-based polymer (B) aqueous liquid for reaction in the presence of an acid catalyst, and then the resulting solution is neutralized with a basic substance to give a PVA-based polymer (A); (v) to a slurry or powdery PVA-based polymer (B), an aliphatic aldehyde etc. is directly added, or a liquid in which an aliphatic aldehyde is dissolved or dispersed in an organic solvent or water is added for reaction in the presence of an acid catalyst, and then the resulting mixture is neutralized with a basic substance and excess solvent is removed to give a PVA-based polymer (A); etc.

In the methods (i) to (iii), by subsequent drying for removing the solvent, the PVA-based polymer can be obtained as a solid, or alternatively, by replacing the solvent with water, an aqueous liquid can be obtained.

The PVA-based polymer obtained as an aqueous liquid in the method (iv) can be used as it is in suspension polymerization of vinyl chloride.

In the method (v) in which a slurry PVA-based polymer is reacted, the obtained PVA-based polymer is a solid and therefore easy to handle.

In the methods (i) to (v), the method for preparing an aqueous liquid of the PVA-based polymer (A) or the PVA-based polymer (B), and the methods for saponification, neutralization, dissolution, dispersion, and drying are not particularly limited, and conventional methods may be used.

The basic substance used for neutralization is not particularly limited, and examples thereof include alkali metal hydroxides, such as sodium hydroxide and potassium hydroxide; alkali metal carbonates, such as sodium carbonate and potassium carbonate; primary alkanolamines, such as monoethanolamine, aminoethylethanolamine, monoisopropanolamine, N-(2-hydroxypropyl)-ethylenediamine, 2-amino-1-butanol, 2-amino-2-methyl-1-propanol, 3-amino-1-propanol, 2-amino-2-methyl-1,3-propanediol, 2-amino-2-ethyl-1,3-propanediol, and tris(hydroxyethyl)-aminomethane; secondary alkanolamines, such as diethanolamine, methylethanolamine, butylmethanolamine, N-acetylethanolamine, and diisopropanolamine; tertiary alkanolamines, such as triethanolamine, methyldiethanolamine, dimethylethanolamine, diethylethanolamine, ethyldiethanolamine, and tri-isopropanolamine; primary alkylamines, such as methylamine, ethylamine, isobutylamine, tert-butylamine, and cyclohexylamine; secondary alkylamines, such as dimethylamine, diethylamine, and diisopropylamine; and tertiary alkylamines, such as trimethylamine.

The pH of the reaction mixture at the time of acetalization is preferably 3.0 or less from the viewpoint of reaction rate.

The pH of the reaction mixture after neutralization is preferably 4.7 to 8.5.

Production Method of Vinyl-Based Polymer

The method of suspension polymerization of a vinyl-based monomer using the dispersion assistant of the present invention will be described.

For the suspension polymerization, a vinyl-based monomer is dispersed in an aqueous solvent (for example, water, heated water, etc.) with a dispersion stabilizer and the dispersion assistant of the present invention. The suspension polymerization is usually performed in the presence of a polymerization initiator.

The vinyl-based monomer to be subjected to suspension polymerization is not particularly limited, and examples thereof include vinyl chloride, vinylidene halides, vinyl ethers, vinyl esters (such as vinyl acetate and vinyl benzoate), (meth)acrylic acids, (meth)acrylic esters (such as (meth)acrylic acid alkyl esters), styrene-based monomers (such as styrene), unsaturated dicarboxylic acid (such as maleic acid) or anhydrides thereof, olefins (such as ethylene and propylene), etc. Preferably, the vinyl-based monomer comprises at least vinyl chloride. The vinyl-based monomers may be used alone or in combination of two or more kinds thereof.

By suspension polymerization of a vinyl-based monomer comprising vinyl chloride, a vinyl chloride-based resin can be obtained. In the production of the vinyl chloride-based resin, the vinyl chloride content is preferably 50 to 100 mol % (or 50 to 100% by mass) relative to the total amount of vinyl-based monomers used.

Examples of the dispersion stabilizer include water-soluble polymers, such as cellulose derivatives (such as methyl cellulose, hydroxypropylcellulose, hydroxypropylmethylcellulose, and carboxymethylcellulose), gelatin, polyvinyl alcohol, and polyvinyl pyrrolidone, etc. The dispersion stabilizers may be used alone or in a combination of two or more thereof.

Among them, PVA-based polymers are preferred. The saponification degree of the PVA-based polymer is preferably 60 mol % or higher, and more preferably higher than 65 mol % (for example, 65 to 90 mol %, 66 mol % or higher, 67 mol % or higher, 68 mol % or higher, 69 mol % or higher, 70 mol % or higher, higher than 70 mol %, etc.). Also, the polymerization degree of the PVA-based polymer is preferably 300 to 4000, and more preferably 500 to 3000.

The amount of the dispersion stabilizer added may be selected according to the type of the dispersion stabilizer and other factors and cannot be unconditionally specified, but is usually 5 parts by mass or less, preferably 0.005 to 1 part by mass, and more preferably 0.01 to 0.5 part by mass relative to 100 parts by mass of the vinyl-based monomer.

The amount of the dispersion assistant of the present invention used is not particularly limited, but the mass of the PVA-based polymer (A) (the PVA-based polymer (A) contained in the dispersion assistant) is 1 part by mass or less, preferably 0.002 to 0.5 part by mass, and more preferably 0.005 to 0.2 part by mass relative to 100 parts by mass of the vinyl-based monomer.

The mass ratio of the dispersion stabilizer and the PVA-based polymer (A) (the PVA-based polymer (A) contained in the dispersion assistant of the present invention) may be selected according to the type of the dispersion stabilizer and other factors, and cannot be unconditionally specified, but is preferably in the range of 90/10 to 30/70 and particularly preferably in the range of 80/20 to 50/50.

Generally, an increased ratio of a dispersion assistant (in particular, an increased ratio of a dispersion assistant to the dispersion stabilizer) leads to a vinyl-based resin excellent in residual monomer removability and plasticizer absorbability. However, the dispersion assistant of the present invention, even when added in a reduced amount, gives a vinyl-based polymer having excellent properties (residual monomer removability, plasticizer absorbability, etc.).

The dispersion assistant and the dispersion stabilizer may be added all at once at the beginning of the polymerization or added in divided portions during the polymerization.

The dispersion assistant of the present invention may be present (for example, added) in the form of a powder in the polymerization system of the vinyl-based monomer. Alternatively, an aqueous liquid (preferably, an aqueous liquid containing 30 to 50% by mass of the PVA-based polymer (A)) may be prepared before use. Also, the dispersion assistant of the present invention may be dissolved in a water-soluble organic solvent or a mixed solvent of water and an organic solvent and then added to the polymerization system. The dispersion assistant of the present invention may be added at the same time as or after the addition of the vinyl-based monomer, but is preferably placed in the polymerization system before the addition of the vinyl-based monomer.

The polymerization initiator is not particularly limited, and oil-soluble initiators are preferred. Examples thereof include percarbonate compounds, such as diisopropyl peroxydicarbonate, di-(2-ethylhexyl)peroxydicarbonate, and diethoxyethyl peroxydicarbonate; peroxyester compounds, such as t-butylperoxyneodecanoate, t-hexylperoxyneodecanoate, t-hexylperoxypivalate, α-cumylperoxyneodecanoate, t-hexylneohexanoate, and 2,4,4-trimethylpentyl-2-peroxy-2-neodecanoate; azo compounds, such as azobis(2,4-dimethylvaleronitrile) and azobisisobutylonitrile; peroxide compounds, such as lauryl peroxide, benzoyl peroxide, cumene hydroperoxide, and 2,4,4-trimethylpentyl-2-peroxyphenoxyacetate; etc.

The polymerization initiators may be used alone or in a combination of two or more thereof.

The polymerization initiator may be added before or after the addition of water or the monomer. Also, the polymerization initiator may be prepared as an aqueous emulsion before added to the polymerization tank.

The amount of the polymerization initiator added is preferably 0.02 to 0.5 part by mass relative to 100 parts by mass of the vinyl monomer or a monomer mixture containing the vinyl monomer.

As long as the effects of the present invention are not hindered, a cationic, anionic, or nonionic surfactant etc. may be added at the time of suspension polymerization.

Various conditions in the production method of the vinyl-based resin of the present invention may be determined according to the known art. There are no particular limitations in the polymerization conditions, such as the method for feeding each starting compound, the feeding ratio between the monomer and the aqueous solvent, the polymerization temperature, the polymerization conversion rate, the stirring rate, etc. As needed, various publicly known additives, such as a pH adjuster, a defoaming agent, a polymerization degree modifier, a chain transfer agent, an antioxidant, and an antistatic agent, may be used in combination.

The PVA-based polymer as the dispersion stabilizer may be a PVA-based polymer different from the PVA-based polymer (A) (for example, a PVA-based polymer which is not within the category of the PVA-based polymer (A)). For example, PVA-based polymers usually do not have (substantially do not have) the constituent unit represented by the general formula (1), and when the PVA-based polymer as the dispersion stabilizer has the constituent unit, the content per polyvinyl alcohol monomer unit may be outside the above-described range (for example, less than 0.1 mol %, 0.05 mol % or less, or the like).

As described above, the PVA-based polymer (A) may be used in combination with a water-soluble polymer as a dispersion stabilizer.

Therefore, the present invention encompasses a composition comprising a water-soluble polymer (or a dispersion stabilizer, for example, the above PVA-based polymer) and the PVA-based polymer (A) (or the dispersion assistant for suspension polymerization).

Regarding such a composition, the timing of combining (mixing) the water-soluble polymer and the PVA-based polymer (A) is not particularly limited. It is allowed that the PVA-based polymer (A) and the water-soluble polymer are mixed in suspension polymerization to form a composition in the polymerization system. It is also allowed that a composition comprising the PVA-based polymer (A) and the water-soluble polymer is prepared beforehand and then used in suspension polymerization.

The mass ratio of the dispersion stabilizer (water-soluble polymer) and the PVA-based polymer (A) may be selected from a similar range to the one described above, and may be, for example, 90/10 to 30/70 (in particular, 80/20 to 50/50).

The composition of the present invention may comprise other components. For example, the composition of the present invention may be formed in a polymerization system (suspension polymerization system) as described above, and therefore, may comprise the components present in the polymerization system (a vinyl-based monomer, a polymerization initiator, a solvent, various additives, or the like).

In the cases where the composition of the present invention comprises a vinyl-based monomer, the ratio of the dispersion stabilizer or the dispersion assistant may be selected from a similar range to the one described above.

For example the ratio of the dispersion stabilizer (water-soluble polymer) may be 5 parts by mass or less, for example, preferably 0.005 to 1 part by mass, and more preferably 0.01 to 0.5 part by mass relative to 100 parts by mass of the vinyl-based monomer.

Also, the ratio of the dispersion assistant (PVA-based polymer (A)) may be 1 part by mass or less, preferably 0.002 to 0.5 part by mass, and more preferably 0.005 to 0.2 part by mass relative to 100 parts by mass of the vinyl-based monomer.

EXAMPLES

Hereinafter, the present invention will be illustrated in more detail by Examples, but the present invention is not limited thereto.

In the Examples and Comparative Example, "%" and "parts" express "% by mass" and "part(s) by mass" unless otherwise stated.

First, methods for evaluating the properties of vinyl chloride resins employed in the EXAMPLES are shown below.

Evaluation of Vinyl Chloride Resin

Vinyl chloride resins were evaluated in view of the amount of attached scale, the residual monomer removability, and the plasticizer absorbability as follows.

Amount of Attached Scale

After the polymer slurry was discharged from the polymerization tank, the scale adhesion on the inner wall of the polymerization tank was visually observed and evaluated based on the following criteria.

A: Almost no scale adhesion is observed
B: Visually noticeable adhesion is observed
C: Remarkable adhesion of white scale is observed Residual Monomer Removability In 25 g of tetrahydrofuran, 1 g of a vinyl chloride resin was dissolved, and the vinyl chloride monomer content in the vinyl chloride resin was quantified by gas chromatography. The evaluation was performed based on the following criteria.

A: Less than 5 ppm
B: Not less than 5 ppm and less than 10 ppm
C: Not less than 10 ppm Plasticizer Absorbability In a cylindrical container having fiberglass placed in the bottom, the obtained resin was placed, and excess dioctyl phthalate (hereinafter abbreviated as DOP) was added thereto. The mixture was left to stand for 30 minutes for infiltration of the DOP into the resin and subjected to centrifugal separation at 3000 rpm for removal of excess DOP. Then the resin was weighed to calculate the amount of the DOP absorbed into 100 parts by mass of the polymer. A larger amount of absorbed DOP means a higher porosity, a higher plasticizer absorbability, and a higher molding processability of the resin.

Example 1

Synthesis of PVA-Based Polymer (B)

In a polymerization tank equipped with a stirrer, a condenser, a nitrogen gas inlet, and an initiator feeding port, 10 parts by mass of vinyl acetate, 67 parts by mass of methanol, and 0.02 part by mass of 2,2'-azobis(4-methoxy-2,4-dimethylvaleronitrile) were placed. After replacement with nitrogen gas, the system was heated to the boiling point. Then, from the upper part of the polymerization tank, 140 parts by mass of vinyl acetate was continuously and slowly added dropwise over 13 hours. One hour after the completion of the dropping, when the polymerization degree reached 95%, the system was cooled to terminate the polymerization.

Subsequently, unreacted vinyl acetate was removed in the usual manner, and the methanol content was adjusted so that the concentration of polyvinyl acetate might be 60%. To 100 parts by mass of the obtained 60% polyvinyl acetate solution in methanol, 3 parts by mass of a 45% p-toluenesulfonic acid solution in methanol as a saponification catalyst was added and thoroughly mixed, and saponification was allowed to proceed at 55° C. To this, 5.5 parts by mass of a 5% sodium hydroxide solution in methanol was added for neutralization to terminate the saponification, and thus a solution of a PVA-based polymer (B) was obtained. The obtained solution, after drying, was analyzed. The saponification degree was 55 mol %, the average polymerization degree was 230, and the block character was 0.70.

Synthesis of PVA-Based Polymer (A)

To 100 parts by mass of the above-obtained solution of PVA-based polymer (B), 2 parts by mass of water was added, and then 1.0 part by mass of hexanal was added and thoroughly mixed. To this, 1 part by mass of a 45% p-toluenesulfonic acid solution in methanol was added, and reaction was allowed to proceed at 40° C. for 30 minutes. Then, the mixture was neutralized with 2.3 parts by mass of a 5% sodium hydroxide aqueous solution. Subsequently, this was dried at 100° C. for 2 hours using a vacuum dryer to give a PVA-based polymer (A). The analysis of the PVA-based polymer (A) showed that the saponification degree was 56 mol %, the polymerization degree was 230, and the block character was 0.70. Moreover, when the PVA-based polymer (A) dissolved in a $d_6$-DMSO solvent was subjected to $^1$H-NMR spectroscopy, a signal attributable to a methyl group was observed at 0.85 ppm. The modification degree of the PVA-based polymer (A) modified by hexanal calculated from the signal strengths was 1.0 mol %.

The summary of the production conditions and the analysis results of the PVA-based polymer (A) are shown in Table 1.

Preparation of Aqueous Liquid

The PVA-based polymer (A) obtained as above was put into water so that the PVA-based polymer (A) as a solute might be comprised in an amount of 40% by mass. The mixture was stirred at 80° C. for 1 hour to dissolve the solute, and then cooled to room temperature to give an aqueous liquid.

Suspension Polymerization of Vinyl Chloride

Using the above-obtained PVA-based polymer (A) as a dispersion assistant, suspension polymerization of vinyl chloride was performed on the conditions shown below.

In a 100-L polymerization vessel (pressure-proof autoclave unit), 0.05 part by mass of partially saponified polyvinyl alcohol (saponification degree: 80 mol %, polymerization degree: 2500) and 0.02 part by mass of partially saponified polyvinyl alcohol (saponification degree: 72 mol %, polymerization degree: 800) dissolved in 100 parts of deionized water were placed. To this, 0.075 part by weight of the above-obtained aqueous liquid (comprising 40% by weight of the PVA-based polymer (A)) (0.03 part by mass as the PVA-based polymer (A)) was added, and 0.05 part by mass of t-butylperoxyneodecanoate was further added. The pressure inside the polymerization vessel was reduced to 40 mmHg for deaeration, 100 parts by mass of a vinyl chloride monomer was added, and polymerization was started. The polymerization temperature was 57° C., which was maintained until the end of the polymerization.

At the time when the polymerization conversion rate reached 80%, the reaction is terminated, and unreacted monomer in the polymerization vessel was recovered. Then, the polymer slurry was taken out of the system, dehydrated, and dried to give a vinyl chloride resin. The evaluation results of the vinyl chloride resins are shown in Table 2.

With the dispersion assistant, scale adhesion to the polymerization tank was hardly observed, stable suspension polymerization was achieved, and a vinyl chloride-based resin having an excellent residual monomer removability, a plasticizer absorbability of 25%, and a high porosity was obtained.

Examples 2 to 5

PVA-based polymers (A) were synthesized as in Example 1 except that aldehydes shown in Table 1 were used instead of hexanal, and aqueous liquids comprising the PVA-based polymers (A) were prepared as in Example 1. Using the obtained aqueous liquids, suspension polymerization of vinyl chloride was performed as in Example 1 to give vinyl chloride resins. The evaluation results of the vinyl chloride resins are shown in Table 2.

In each of the Examples, scale adhesion to the polymerization tank was hardly observed, stable suspension polymerization was achieved, and a vinyl chloride-based resin having an excellent residual monomer removability, a high plasticizer absorbability, and a high porosity was obtained.

Examples 6 and 7

PVA-based polymers (A) were synthesized as in Example 1 except that the amount of hexanal used was changed so as to achieve the contents shown in Table 1, and aqueous liquids comprising the PVA-based polymers (A) were prepared as in Example 1. Using the obtained aqueous liquids, suspension polymerization of vinyl chloride was performed as in Example 1 to give vinyl chloride resins. The evaluation results of the vinyl chloride resins are shown in Table 2.

In both Examples, scale adhesion to the polymerization tank was hardly observed, stable suspension polymerization was achieved, and a vinyl chloride-based resin having an excellent residual monomer removability, a high plasticizer absorbability, and a high porosity was obtained.

Examples 8 to 14

Various PVA-based polymers (B) having the polymerization degree, saponification degree, and the block character shown in Table 1 were synthesized by appropriately changing the reaction conditions. Subsequently, PVA-based polymers (A) were synthesized as in Example 1, and aqueous liquids comprising the PVA-based polymers (A) were prepared as in Example 1.

In Example 10, a solvent mixture of water/methanol=1/1 was used instead of water to prepare an aqueous liquid comprising 20% by weight of the PVA-based polymer (A). In Example 11, a solvent mixture of water/methanol=1/1 was used instead of water to prepare an aqueous liquid comprising 40% by weight of the PVA-based polymer (A). In Example 14, a solvent mixture of water/methanol=1/1 was used instead of water to prepare an aqueous liquid comprising 20% by weight of the PVA-based polymer (A).

Using the obtained aqueous liquids, suspension polymerization of vinyl chloride was performed as in Example 1 to give vinyl chloride resins. The evaluation results of the vinyl chloride resins are shown in Table 2.

In each of the Examples, scale adhesion to the polymerization tank was hardly observed, stable suspension polymerization was achieved, and a vinyl chloride-based resin having an excellent residual monomer removability, a high plasticizer absorbability, and a high porosity was obtained.

Comparative Example 1

Using the PVA-based polymer (B) without acetalization instead of the PVA-based polymer (A), an aqueous liquid was prepared as in Example 1. Using the obtained aqueous liquid, suspension polymerization of vinyl chloride was performed as in Example 1 to give a vinyl chloride resin. The evaluation results of the vinyl chloride resin are shown in Table 2.

Scale adhesion was hardly observed, and stable suspension polymerization was achieved, but the plasticizer absorbability of the obtained vinyl chloride resin was 19%, which was insufficient.

Reference Example 1

A PVA-based polymer (A) was synthesized as in Example 1 except that acrolein, an aldehyde not having any alkyl groups, was used as the aldehyde, and an aqueous liquid comprising the PVA-based polymers (A) was prepared as in Example 1. Using the obtained aqueous liquid, suspension polymerization of vinyl chloride was performed as in Example 1 to give a vinyl chloride resin. The evaluation results of the vinyl chloride resin are shown in Table 2.

Scale adhesion was hardly observed, and stable polymerization was achieved, but the residual monomer removability and the plasticizer absorbability of the obtained vinyl chloride resin were insufficient.

Reference Examples 2 and 3

PVA-based polymers (A) were synthesized as in Example 1 except that the amount of hexanal used was changed so as to achieve the contents shown in Table 1, and aqueous liquids comprising the PVA-based polymers (A) were prepared as in Example 1 (In Reference Example 3, due to the high hexanal content, the compatibility with water was poor, and therefore, a solvent mixture of water/methanol=1/1 was used instead of water to prepare an aqueous liquid comprising 40% by weight of the PVA-based polymer (A).). Using the obtained aqueous liquids, suspension polymerization of vinyl chloride was performed as in Example 1 to give vinyl chloride resins. The evaluation results of the vinyl chloride resins are shown in Table 2.

In Reference Example 2, due to the too little content, a sufficient effect could not be obtained. In Reference Example 3, due to the too much content, the dispersibility in the aqueous medium was poor in the suspension polymerization, and a sufficient effect could not be obtained.

Reference Examples 4 and 5

PVA-based polymers (B) having the saponification degree shown in Table 1 were synthesized by appropriately changing the reaction conditions. Subsequently, PVA-based polymers (A) were synthesized as in Example 1, and aqueous liquids comprising the PVA-based polymers (A) were prepared as in Example 1 (In Reference Example 4, due to the low saponification degree of the PVA-based polymer (A), the compatibility with water was poor, and therefore, a solvent mixture of water/methanol=1/4 was used instead of water to prepare an aqueous liquid comprising 40% by weight of the PVA-based polymer (A).). Using the obtained aqueous liquids, suspension polymerization of vinyl chloride was performed as in Example 1 to give vinyl chloride resins. The evaluation results of the vinyl chloride resins are shown in Table 2.

In Reference Example 4, due to the too low saponification degree, the dispersibility in the aqueous medium was poor in the suspension polymerization, and a sufficient effect could not be obtained. In Reference Example 5, the hydrophilicity was too high, and the residual monomer removability and the plasticizer absorbability of the obtained vinyl chloride resin were insufficient.

TABLE 1

| | PVA(B) | | | Acetalization | | | PVA(A) | | | Preparation of aqueous liquid | |
|---|---|---|---|---|---|---|---|---|---|---|---|
| | Polymerization degree | Saponification degree mol % | Block character | Aldehyde | Number of carbon atoms | Content mol % | Polymerization degree | Saponification degree mol % | Block character | Concentration weight % | Solvent used |
| Example 1 | 230 | 55 | 0.70 | Hexanal | 6 | 1.0 | 230 | 56 | 0.70 | 40 | Water |
| Example 2 | 230 | 55 | 0.70 | Butanal | 4 | 1.0 | 230 | 56 | 0.70 | 40 | Water |
| Example 3 | 230 | 55 | 0.70 | 2-Ethylhexanal | 8 | 1.0 | 230 | 56 | 0.70 | 40 | Water |
| Example 4 | 230 | 55 | 0.70 | Decanal | 10 | 1.0 | 230 | 56 | 0.70 | 40 | Water |

TABLE 1-continued

| | PVA(B) | | | Acetalization | | | PVA(A) | | | Preparation of aquesous liquid | |
|---|---|---|---|---|---|---|---|---|---|---|---|
| | Polymerization degree | Saponification degree mol % | Block character | Aldehyde | Number of carbon atoms | Content mol % | Polymerization degree | Saponification degree mol % | Block character | Concentration weight % | Solvent used |
| Example 5 | 230 | 55 | 0.70 | Dodecanal | 12 | 1.0 | 230 | 56 | 0.70 | 40 | Water |
| Example 6 | 230 | 55 | 0.70 | Hexanal | 6 | 0.3 | 230 | 56 | 0.70 | 40 | Water |
| Example 7 | 230 | 55 | 0.70 | Hexanal | 6 | 5.0 | 230 | 56 | 0.70 | 40 | Water |
| Example 8 | 150 | 55 | 0.70 | Hexanal | 6 | 1.0 | 150 | 56 | 0.70 | 40 | Water |
| Example 9 | 350 | 55 | 0.70 | Hexanal | 6 | 1.0 | 350 | 56 | 0.70 | 40 | Water |
| Example 10 | 1000 | 55 | 0.70 | Hexanal | 6 | 1.0 | 1000 | 56 | 0.70 | 20 | Water/MeOH |
| Example 11 | 230 | 30 | 0.70 | Hexanal | 6 | 1.0 | 230 | 31 | 0.70 | 40 | Water/MeOH |
| Example 12 | 230 | 50 | 0.70 | Hexanal | 6 | 1.0 | 230 | 51 | 0.70 | 40 | Water |
| Example 13 | 230 | 65 | 0.70 | Hexanal | 6 | 1.0 | 230 | 66 | 0.70 | 40 | Water |
| Example 14 | 230 | 55 | 0.40 | Hexanal | 6 | 1.0 | 230 | 56 | 0.42 | 20 | Water/MeOH |
| Comparative Example 1 | 230 | 55 | 0.70 | — | — | — | — | — | — | 40 | Water |
| Reference Example 1 | 230 | 55 | 0.70 | Acrolein | — | 1.0 | 230 | 56 | 0.70 | 40 | Water |
| Reference Example 2 | 230 | 55 | 0.70 | Hexanal | 6 | 0.05 | 230 | 56 | 0.70 | 40 | Water |
| Reference Example 3 | 230 | 55 | 0.70 | Hexanal | 6 | 15 | 230 | 56 | 0.70 | 40 | Water/MeOH |
| Reference Example 4 | 230 | 10 | 0.70 | Hexanal | 6 | 1.0 | 230 | 11 | 0.70 | 40 | Water/MeOH |
| Reference Example 5 | 230 | 75 | 0.70 | Hexanal | 6 | 1.0 | 230 | 76 | 0.70 | 40 | Water |

TABLE 2

| | Evaluation of vinyl chloride resin | | |
|---|---|---|---|
| | Amount of attached scale | Residual monomer removability | Plasticizer absorbability % |
| Example 1 | A | A | 25 |
| Example 2 | A | B | 23 |
| Example 3 | A | A | 25 |
| Example 4 | A | A | 24 |
| Example 5 | A | A | 24 |
| Example 6 | A | B | 23 |
| Example 7 | A | A | 24 |
| Example 8 | B | B | 23 |
| Example 9 | A | A | 24 |
| Example 10 | A | B | 23 |
| Example 11 | A | A | 24 |
| Example 12 | A | A | 25 |
| Example 13 | A | B | 23 |
| Example 14 | A | A | 25 |
| Comparative Example 1 | A | B | 18 |
| Reference Example 1 | A | C | 17 |
| Reference Example 2 | A | B | 18 |
| Reference Example 3 | B | C | 17 |
| Reference Example 4 | B | C | 17 |
| Reference Example 5 | B | C | 17 |

INDUSTRIAL APPLICABILITY

The dispersion assistant of the present invention, when used for suspension polymerization of a vinyl-based compound, achieves highly stable polymerization. Also, the dispersion assistant of the present invention is capable of reducing residual monomers in the resulting polymer, and therefore, contributes to energy saving and productivity improvement. In addition, the resulting polymer has an excellent plasticizer absorbability, and therefore has an excellent molding processability.

Furthermore, since the aqueous liquid of the present invention can be handled as a stable aqueous liquid even at a high concentration, environmental burden due to the use of organic solvents can be reduced. Therefore, the aqueous liquid of the present invention is industrially highly useful.

The invention claimed is:

1. A dispersion assistant for suspension polymerization comprising a polyvinyl alcohol-based polymer (A) comprising a vinyl alcohol monomer unit and a constituent unit represented by the general formula (1) shown below at 0.1 to 10 mol % and having a saponification degree of 15 to 70 mol %, wherein R denotes an alkyl group, and wherein mol % is based on the sum of the vinyl alcohol monomer unit and the constituent unit.

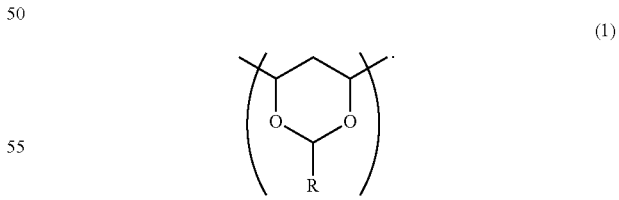

(1)

2. The dispersion assistant for suspension polymerization of claim 1, wherein R in the constituent unit represented by the general formula (1) is an alkyl group having 3 to 11 carbon atoms.

3. The dispersion assistant for suspension polymerization of claim 1, wherein the average polymerization degree of the polyvinyl alcohol-based polymer (A) is 120 to 800.

4. An aqueous liquid comprising the dispersion assistant for suspension polymerization of claim 1.

5. The aqueous liquid of claim 4, wherein the polyvinyl alcohol-based polymer (A) has a saponification degree of 50 to 70 mol %, an average polymerization degree of 120 to 400, and a block character of 0.5 or higher.

6. The aqueous liquid of claim 4, comprising the polyvinyl alcohol-based polymer (A) in an amount of 30 to 50% by mass.

7. A production method of a vinyl-based resin, comprising subjecting a vinyl-based monomer to suspension polymerization in the presence of the dispersion assistant for suspension polymerization of claim 1.

8. The production method of claim 7, wherein a water-soluble polymer is further present in the suspension polymerization.

9. The production method of claim 8, wherein the water-soluble polymer is a polyvinyl alcohol-based polymer having a saponification degree of 65 to 90 mol %.

10. The production method of claim 7, wherein the vinyl-based monomer comprises vinyl chloride.

11. A composition comprising a water-soluble polymer and the dispersion assistant for suspension polymerization comprising the polyvinyl alcohol-based polymer (A) of claim 1.

12. The composition of claim 11, wherein the water-soluble polymer comprises a polyvinyl alcohol-based polymer having a saponification degree of 65 to 90 mol % and the mass ratio between the water-soluble polymer and the polyvinyl alcohol-based polymer (A) is 90/10 to 30/70.

* * * * *

UNITED STATES PATENT AND TRADEMARK OFFICE
CERTIFICATE OF CORRECTION

PATENT NO. : 11,339,232 B2
APPLICATION NO. : 16/343377
DATED : May 24, 2022
INVENTOR(S) : Takehiro Omori et al.

It is certified that error appears in the above-identified patent and that said Letters Patent is hereby corrected as shown below:

In the Specification

Column 7, Line 36, delete "(71)" and insert -- (η) --.

Column 19-20, Line 56 (approx.), delete "aquesous" and insert -- aqueous --.

Column 21-22, Line 3 (approx.), delete "aquesous" and insert -- aqueous --.

Signed and Sealed this
Twenty-fifth Day of October, 2022

Katherine Kelly Vidal
*Director of the United States Patent and Trademark Office*